A. A. SCHWARTZ.
FRACTIONAL SPACING DEVICE FOR TYPE WRITING MACHINES.
APPLICATION FILED MAY 3, 1915.
1,189,743. Patented July 4, 1916.
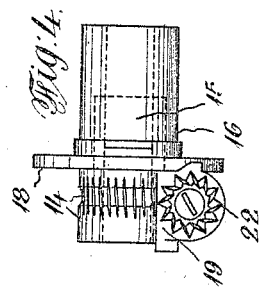
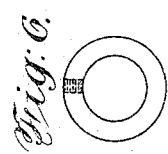
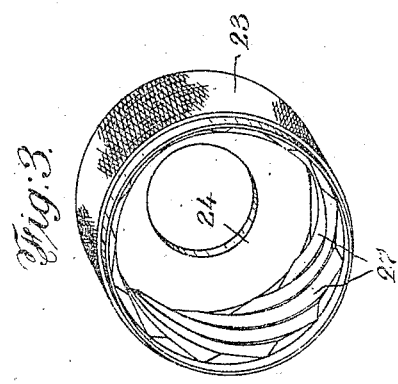
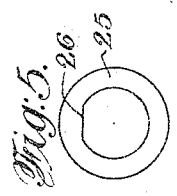
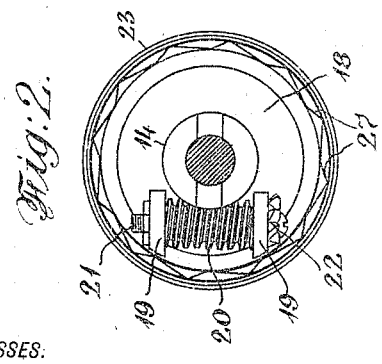
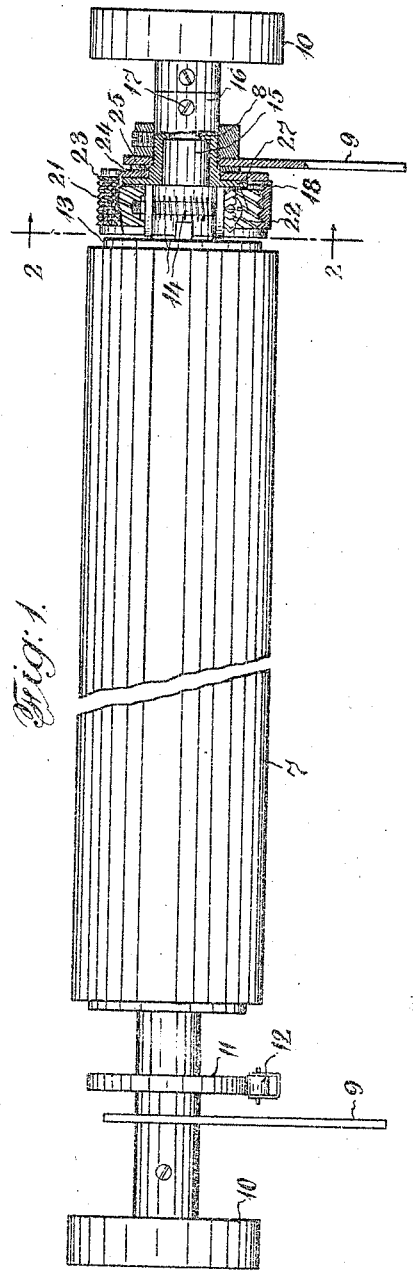
WITNESSES:
L. J. Browning
Rosie Dobson
INVENTOR
Albert A. Schwartz
BY
Edward C. Davidson
ATTORNEY

UNITED STATES PATENT OFFICE.

ALBERT A. SCHWARTZ, OF NEW YORK, N. Y., ASSIGNOR TO ROYAL TYPEWRITER COMPANY, INC., OF NEW YORK, N. Y., A CORPORATION OF NEW YORK.

FRACTIONAL-SPACING DEVICE FOR TYPE-WRITING MACHINES.

1,189,743.  Specification of Letters Patent.  Patented July 4, 1916.

Application filed May 3, 1915. Serial No. 25,430.

*To all whom it may concern:*

Be it known that I, ALBERT A. SCHWARTZ, a citizen of the United States of America, residing in the borough of the Bronx, city of New York, county of Bronx, State of New York, have invented a certain new and useful Fractional-Spacing Device for Type-Writing Machines, of which the following is a specification.

This invention relates to the line spacing of typewriting machines and consists in novel mechanism for the minute or extensive rotation of the platen operated independently of the ordinary line-spacing mechanism.

The accompanying drawings illustrate the invention and the coöperating parts of a typewriting machine.

Figure 1 is a longitudinal view of a platen supported in the end frames of a carriage, showing the fractional spacing device in section: Fig. 2, a transverse view taken on line 2, 2, Fig. 1, on an enlarged scale: Fig. 3, a perspective view of the cylindrical manipulating part of the device: Fig. 4, a side elevation of the supporting sleeve and attached parts: Fig. 5, shows the spacing washer: and Fig. 6, the outer collar.

The platen 7, its shaft 8, carriage end frames 9, turning knobs 10, ratchet wheel 11 and detent roller 12 are of ordinary construction.

A plate 13, secured to the end of the platen, is by a clutch tooth connected to the worm wheel 14 having a reduced portion or hub 15 and bored to fit on the shaft 8. This hub 15 seats in a recess in a sleeve 16 whose outer end is bored to fit on shaft 8 and is provided with a set screw 17 by which the sleeve is securely fastened to the shaft 8. On the inner end of the sleeve is a flange 18 on which are bearing projections 19, between which is a worm 20 located to engage the worm wheel 14, said worm being held in place between the projections 19 by a shaft 21. At the outer side of one of the projections is a disk or wheel 22 having angularly arranged teeth and secured to the worm 20. The cylindrical manipulating part 23 surrounds the worm wheel 14, worm 20 and toothed wheel 22, and is provided with a plate or internal flange 24 having a bearing on a shoulder on the sleeve adjacent the flange 18 and between the plate 24 and the frame of the carriage is a spacing washer 25. This washer has a part of its opening straight (as shown at 26, Fig. 5,) to cause it to rotate with the sleeve 16. Formed in the inner periphery of the manipulating part 23 is a screw 27 which is preferably multi-threaded, the threads of which mesh snugly in the teeth of the wheel 22, whereby slight rotary movements of the cylindrical part 23 will impart movement of the platen on the shaft 8, which is held stationary by the ratchet 11 and detent roller 12. The outer periphery of the part 23 is knurled to facilitate handling the same. Practice has demonstrated that twelve is a suitable number of threads in the screw 27 to provide adequate adjustment of the platen, and this adjustment of the platen may be made at any time, irrespective of the other platen controlling means, for setting the line of print anywhere between the usual spaced lines, or resetting an ordinary spaced line exactly to the line of printing, and also enables the platen to be properly set in filling in the blanks of forms, etc.

As stated the adjusting part 23 may have twelve threads 27 to provide a suitable thread-pitch action on the wheel 22. This number of threads may be varied. For instance, a less number may be used and the pitch of thread of worm 20 increased or it may be made a double thread or otherwise multiplied to provide the necessary or required ratio of action between the manipulating piece 23 and the platen.

I claim:

1. A fractional line spacing device for typewriting machines, comprising a cylindrical manipulating part having a screw formed on its interior periphery, a toothed wheel having a bearing on a sleeve secured to the platen shaft and meshing in the internal thread of the manipulating part and a gear connection between said toothed wheel and the platen.

2. A fractional line spacing device for typewriting machines, comprising a cylindrical manipulating part having a multi-thread screw formed on its interior periphery, a toothed wheel having a bearing on a sleeve secured to the platen shaft and meshing in the internal thread of the manipulating part and a gear connection between said toothed wheel and the platen.

3. A fractional line spacing device for typewriting machines, comprising a cylindrical manipulating part having a screw formed on its interior periphery, a toothed wheel having a bearing on a sleeve secured to the platen shaft and meshing in the internal thread of the manipulating part, a worm wheel having a hub seated in a recess in the sleeve, a worm connected to the toothed wheel and a clutch connection between the worm wheel and the end of the platen.

4. A fractional line spacing device for typewriting machines, comprising a cylindrical manipulating part having a multi-thread screw formed on its interior periphery, a toothed wheel having a bearing on a sleeve secured to the platen shaft and meshing in the internal thread of the manipulating part, a worm wheel having a hub seated in a recess in the sleeve, a worm connected to the toothed wheel and a clutch connection between the worm wheel and the end of the platen.

5. A fractional line spacing device for typewriting machines, comprising a cylindrical manipulating part having a screw formed on its interior periphery and a flange at one side, a sleeve secured to the platen shaft and having a bearing in an end frame of the carriage and a flange at its inner end provided with bearing projections, a worm located between and carried by said projections, a toothed wheel secured to one end of the worm and meshing into the internal screw thread of the manipulating part, a worm wheel into which the worm meshes and having a hub seated in a recess of the sleeve, a clutch connection between the worm wheel and the end of the platen, the flange of the manipulating part having a bearing on the sleeve adjacent its flange.

6. A fractional line spacing device for typewriting machines, comprising a cylindrical manipulating part having a screw formed on its interior periphery and a flange at one side, a sleeve secured to the platen shaft and having a bearing in an end frame of the carriage and a flange at its inner end provided with bearing projections, a worm located between and carried by said projections, a toothed wheel secured to one end of the worm and meshing into the internal screw thread of the manipulating part, a worm wheel into which the worm meshes and having a hub seated in a recess of the sleeve, a clutch connection between the worm wheel and the end of the platen, the flange of the manipulating part having a bearing on the sleeve adjacent its flange, a spacing washer between the flange of the manipulating part and the carriage frame and a collar on the outer end of the sleeve.

In testimony whereof, I have hereunto subscribed my name.

ALBERT A. SCHWARTZ

Witnesses:
GEORGE F. HANDLEY,
L. A. MEYERS.